(12) United States Patent
Fahland et al.

(10) Patent No.: US 10,696,294 B2
(45) Date of Patent: Jun. 30, 2020

(54) ACTIVELY CONTROLLING REAR DIFFERENTIAL COUPLING WITH AERO LOAD INFORMATION

(71) Applicant: GM Global Technology Operations LLC, Detroit, MI (US)

(72) Inventors: Jason D. Fahland, Fenton, MI (US); Dale Cattell, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 469 days.

(21) Appl. No.: 15/723,496

(22) Filed: Oct. 3, 2017

(65) Prior Publication Data

US 2019/0100194 A1    Apr. 4, 2019

(51) Int. Cl.
| | | |
|---|---|---|
| *B60W 30/02* | (2012.01) | |
| *B60W 10/16* | (2012.01) | |
| *B60W 40/13* | (2012.01) | |
| *B60W 40/107* | (2012.01) | |
| *B62D 37/02* | (2006.01) | |

(Continued)

(52) U.S. Cl.
CPC ............ *B60W 30/02* (2013.01); *B60W 10/16* (2013.01); *B60W 30/18072* (2013.01); *B60W 30/18109* (2013.01); *B60W 40/107* (2013.01); *B60W 40/13* (2013.01); *B62D 35/007* (2013.01); *B62D 37/02* (2013.01); *B60W 2520/14* (2013.01); *B60W 2520/16* (2013.01); *B60W 2520/18* (2013.01); *B60W 2710/12* (2013.01); *B60W 2720/406* (2013.01)

(58) Field of Classification Search
CPC .......... B60W 30/02; B60W 30/18072; B60W 30/18109; B60W 40/107; B60W 40/13; B60W 10/16; B60W 2720/406; B60W 2520/16; B60W 2520/14; B60W 2710/12; B60W 2520/18; B62D 37/02; B62D 35/007; F16H 48/22; F16H 2059/503; F16H 2048/204; F16D 48/08
See application file for complete search history.

(56) References Cited

U.S. PATENT DOCUMENTS

| | | | |
|---|---|---|---|
| 2017/0088192 A1* | 3/2017 | Auden | B62D 35/00 |
| 2017/0088200 A1* | 3/2017 | Heil | B62D 35/005 |
| 2017/0349167 A1* | 12/2017 | Fahland | B60W 30/18145 |

FOREIGN PATENT DOCUMENTS

| | | |
|---|---|---|
| DE | 10050421 A1 | 5/2002 |
| DE | 102016218052 A1 | 3/2017 |
| DE | 102016225352 A1 | 6/2018 |

* cited by examiner

*Primary Examiner* — Anne Marie Antonucci
(74) *Attorney, Agent, or Firm* — Quinn IP Law

(57) ABSTRACT

A method for actively controlling the balance characteristics of a vehicle includes the following steps: (a) determining an aerodynamic balance, vehicle balance, or both of a vehicle, wherein the vehicle includes a vehicle body, an aerodynamic element coupled to the vehicle body, a rear axle, a front axle, a pair of wheels coupled to the rear axle, a pair of rear wheels coupled to the rear axle, a pair of front wheels coupled to the front axle, an electronic limited slip differential (eLSD) coupled to the rear axle, and the vehicle balance is based on an aerodynamic downforce on the vehicle; (b) determining that there is surplus downforce capacity available based on the vehicle balance; and (c) controlling, by a controller, the eLSD in response to determining that there is surplus downforce capacity available.

20 Claims, 2 Drawing Sheets

(51) Int. Cl.
*B62D 35/00* (2006.01)
*B60W 30/18* (2012.01)

ACTIVELY CONTROLLING REAR DIFFERENTIAL COUPLING WITH AERO LOAD INFORMATION

INTRODUCTION

The present disclosure provides a method for actively controlling a rear differential with aerodynamic load information. Vehicles have been designed with aerodynamic systems, such as an adjustable spoiler which can change the downforce applied to the vehicle. In addition, vehicles include an electronically controlled differential for allowing wheels of an axle to rotate at different speeds and to control torque coupling.

SUMMARY

The present disclosure describes a method for controlling the balance characteristic of a vehicle. For example, the presently disclosed method can be used to control vehicle balance or aerodynamic balance of a vehicle. In some aspects of the present disclosure, the method can actively control an electronic limited slip differential (eLSD) (or any kind of controllable differential) with aerodynamic load information. The optimal amount of coupling torque across the driven axle varies depending on the amount of capacity of the two tires on the driven axle. In the eLSD, the clamping force on the clutch, for example, is controlled externally by a computer or other controller. This allows to control of the coupling torque across the differential. Aerodynamic control systems can change the amount of vertical load acting on the tires and thus change the amount of lateral load and therefore load transfer possible at different speeds by adjusting the aerodynamic element of the vehicle. The vehicle performance can be enhanced by collectively and cooperatively controlling the aerodynamic control system and the eLSD of a vehicle. Both the aerodynamic control system and the eLSD influence vehicle balance and, when used together according to the presently disclosed method, can enhance the overall vehicle performance by increasing downforce at a given vehicle balance when compared to a vehicle that operates the aerodynamic control system and the eLSD independently of each other.

In certain embodiments, the method includes the following steps: (a) determining, via at least one controller, a target vehicle balance of a vehicle, wherein the vehicle includes a vehicle body, an aerodynamic element coupled to the vehicle body, a rear axle, a pair of wheels coupled to the front axle, a pair of rear wheels coupled to the rear axle, an electronic limited slip differential (eLSD) coupled to the rear axle, and the target vehicle balance is based on calibrated aerodynamic downforce acting on both the front and rear axles; (b) determining, via one or more controllers, that there is a surplus of either front or rear downforce capacity available based on maintaining the target vehicle balance; and (c) controlling, by one or more controllers, the eLSD in response to determining that there is a surplus of downforce capacity available. The method further includes determining a highest total downforce possible while meeting the target vehicle balance based on a coupling limits of the eLSD. It is envisioned that the eLSD may alternatively be coupled to the front axle. Also, the vehicle may include may include eLSDs in the front axle and the rear axle. Accordingly, the presently disclosed method can be used to control the coupling torque across an eLSD coupled to the front axle of the vehicle, an eLSD coupled to the rear axle of the vehicle, or both.

The method further includes determining that the vehicle is braking or coasting in response to determining that there is a surplus downforce capacity available. The vehicle includes a front axle coupled to the vehicle body. The method further includes increasing the aerodynamic downforce on the front axle using the aerodynamic element in response to determining that the vehicle is braking or coasting while simultaneously increasing a coupling torque across the eLSD in response to determining that the vehicle is at least one of braking or coasting. The method further includes increasing the aerodynamic downforce on the rear axle using the aerodynamic element in response to determining that the vehicle is braking or coasting while simultaneously decreasing the coupling torque across the eLSD in response to determining that the vehicle is braking or coasting.

The method further includes determining if the vehicle is accelerating, braking or coasting. The aerodynamic downforce on a front axle of the vehicle is increased using the aerodynamic element if the vehicle is accelerating while simultaneously the coupling torque across the eLSD is decreased. The aerodynamic downforce on the rear axle is increased using the aerodynamic element if the vehicle is accelerating while simultaneously the coupling torque across the eLSD is increased. The vehicle balance is based on an aerodynamic downforce on the front axle, an inertial load on the front axle, an aerodynamic downforce on the rear axle, and an inertial load on the rear axle.

The present disclosure also describes a vehicle. In certain embodiments, the vehicle includes a vehicle body, aerodynamic elements coupled to the vehicle body, a rear axle coupled to the vehicle body, wheels coupled to the rear axle, an electronic limited slip differential (eLSD) coupled to the rear axle, a controller in communication with the aerodynamic element and the eLSD. The controller is programmed to: (a) determine a vehicle balance of a vehicle, wherein the vehicle includes a vehicle body, aerodynamic elements coupled to the vehicle body, a rear axle, a pair of wheels coupled to the front axle, a pair of rear wheels coupled to the rear axle, an eLSD coupled to the rear axle, and the vehicle balance is based on an aerodynamic downforce on the rear axle; (b) determine that there is surplus downforce capacity available based on the vehicle balance; and (c) control the eLSD in response to determining that there is surplus downforce capacity available.

The controller is programmed to determine a highest total downforce possible based on a coupling limits of the eLSD. The controller is programmed to determine that the vehicle is either accelerating or braking or coasting in response to determining that there is a surplus downforce capacity available. The vehicle further includes a front axle coupled to the vehicle body. The controller is programmed to adjust the position of the aerodynamic element so as to increase the aerodynamic downforce on the front axle in response to determining that the vehicle is accelerating, braking or coasting. The controller is programmed to control the eLSD so as to decrease a coupling torque across the eLSD in response to determining that the vehicle is at least one of braking or coasting. The controller is programmed to adjust a position of the aerodynamic element so as to increase the downforce on the rear axle using the aerodynamic element while simultaneously controlling the eLSD so as to decrease a coupling torque across the eLSD in response to determining that the vehicle is at least one of braking or coasting.

The aerodynamic element may be a wing-shaped spoiler. The vehicle further includes a support structure. The wing-shaped spoiler is supported by the support structure. The wing-shaped spoiler is movable relative to the support structure between a any given number of spoiler positions. The vehicle further includes an actuator coupled to the wing-shaped spoiler. The actuator is configured to move the wing-shaped spoiler between the positions. The vehicle further includes a pivot point coupled to the wing-shaped spoiler to allow the wing-shaped spoiler to move between positions. The vehicle further includes an inertia measurement unit (IMU) secured to any part of the vehicle. The IMU is configured to compile data regarding the trajectory and attitude of the vehicle and to assist in calculating a vehicle balance. The controller is in communication with the IMU. The controller is in communication with the actuator to control the position of the wing-shaped spoiler. The IMU includes an accelerometer. The controller is in communication with the accelerometer such that data compiled from the accelerometer of the IMU is utilized to control the position of the wing-shaped spoiler via the actuator. The IMU includes a gyroscope, and the controller is in communication with the gyroscope of the IMU such that data compiled from the gyroscope of the IMU is utilized to control the position of the wing-shaped spoiler via the actuator. The wing-shaped spoiler defines a first end and a second end spaced from each other. The pivot point is disposed between the first end and the second end. The IMU is configured to compile data regarding yaw and roll of the vehicle body. The controller is in communication with the IMU and the actuator such that data compiled from the IMU regarding yaw and roll are utilized to control the position of the wing member via the actuator.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
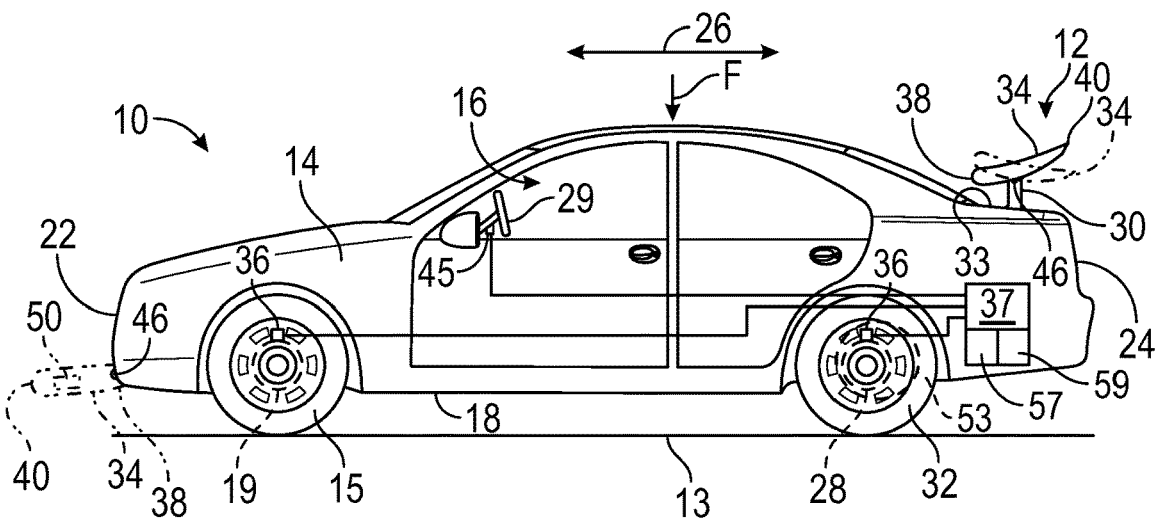
FIG. 1 is a schematic side view of a vehicle and an aerodynamic control system.

Referring to the FIGS. 1-4, wherein like numerals indicate like or corresponding parts throughout the several views, a vehicle 10 and an aerodynamic control system 12 are generally shown in FIG. 1.

The aerodynamic control system 12 can be utilized in a vehicle application or a non-vehicle application. Non-limiting examples of the vehicles 10 can include cars, sports car, race car, trucks, off-road vehicles, motorcycles, aircrafts, farm equipment or any other suitable movable platform. Additionally, the vehicle 10 can include autonomously driven vehicles or vehicles driven via a human. Non-limiting examples of the non-vehicles can include machines, farm equipment or any other suitable non-vehicle.

For the vehicle application as shown in FIG. 1, the vehicle 10 can include a body structure or vehicle body 14. In certain embodiments, the aerodynamic control system 12 can be coupled to the vehicle body 14. Additionally, the vehicle body 14 can define a passenger compartment 16. Generally, one or more occupants can be disposed in the passenger compartment 16. Furthermore, for a vehicle 10 driven by the human, one of the occupants can steer the vehicle 10 from the passenger compartment 16. The passenger compartment 16 can have one or more doors that open and close to allow the occupants to enter and exit the vehicle 10.

Referring to FIG. 1, the vehicle body 14 can also include an interior compartment and a bottom panel 18 that defines a bottom of the interior compartment. In certain embodiments, the interior compartment can be an engine compartment or a storage compartment. Generally, the interior compartment can be spaced from the passenger compartment 16.

Additionally, the bottom panel 18 can include an inner surface facing the interior compartment and an outer surface opposing the inner surface to face away from the interior compartment. Therefore, generally, the outer surface of the bottom panel 18 faces the road surface 13 that the vehicle 10 travels over. In certain embodiments, the bottom panel 18 can include a belly pan.

Referring to FIG. 1, the vehicle body 14 can include a front end 22 and a rear end 24, with a plurality of fascia pieces or panels, some or all of which are visible from the outside of the passenger compartment 16 of the vehicle 10. The front and rear ends 22, 24 are spaced from each other along a length (see double arrow 26 in FIG. 1) of the vehicle 10. Generally, the fascia pieces or panels surround the vehicle 10. The vehicle 10 can also include one or more wheels (i.e., front wheels 15 and rear wheels 32), and therefore, depending on the number of wheels (i.e., front wheels 15 and rear wheels 32) that the vehicle 10 utilizes, one or more of the fascia pieces can be configured to allow the wheel (i.e., front wheels 15 and rear wheels 32) to be disposed under part of the vehicle 10.

The fascia pieces or panels can include one or more of: a front panel which can include a front bumper fascia, a rear panel which can include a rear bumper fascia, and side panel(s) which can include front quarter panel fascia(s) and rear quarter panel fascia(s). FIG. 1 illustrates one side of the vehicle 10, and it is to be appreciated that the other side of the vehicle 10 can be a mirror image of the illustrated side. The sides of the vehicle 10 are spaced from each other in a cross-car direction. The cross-car direction is transverse or perpendicular to the length (as indicated by double arrow 26) of the vehicle 10. In other words, the rear and front quarter panel fascias along one side of the vehicle 10 are spaced in the cross-car direction from the rear and front quarter panel fascias along the other side of the vehicle 10.

Generally, the front bumper fascia can be disposed along the front end 22 of the vehicle 10, and the rear bumper fascia can be disposed along the rear end 24 of the vehicle 10. Therefore, the front quarter panel fascia(s) can be disposed adjacent to the front bumper fascia and the rear quarter panel fascia(s) can be disposed adjacent to the rear bumper fascia.

Figure 2:
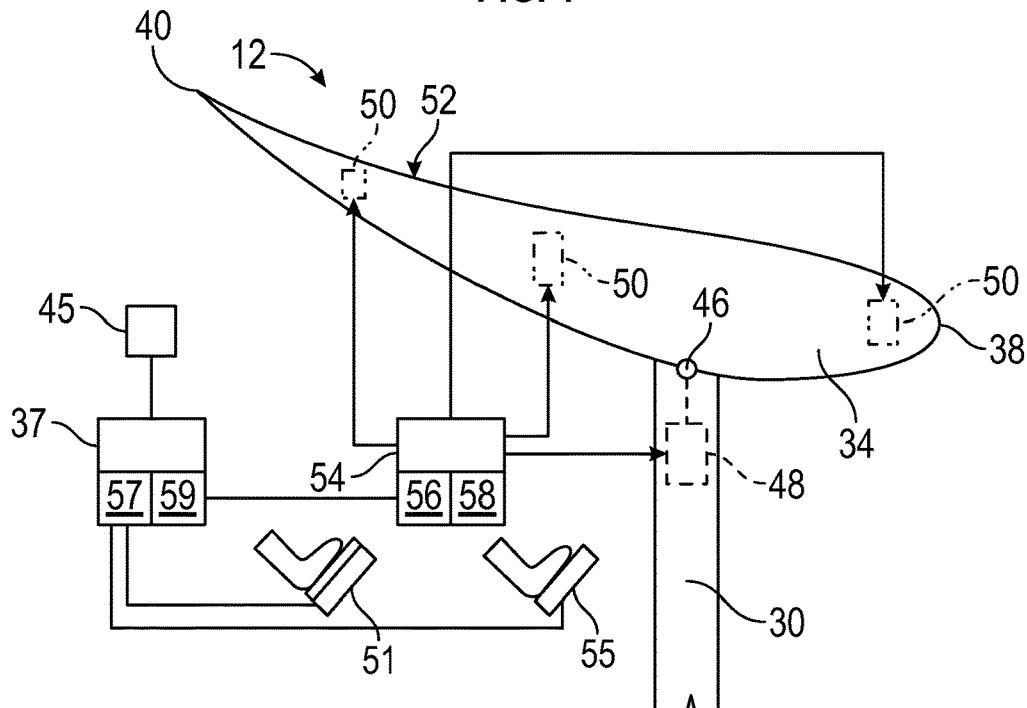
FIG. 2 is a schematic enlarged side view of the aerodynamic control system.

Referring to FIGS. 1 and 2, the aerodynamic control system 12 includes a support structure 30. The support structure 30 can be secured to a component. In the vehicle application, the support structure 30 can be secured to part of the vehicle 10, and thus the component can be part of the vehicle 10. For example, the component can include the vehicle body 14, and thus, the support structure 30 can be fixed to the vehicle body 14. As another example, the component can include one of the panels, and therefore, in certain embodiments, the support structure 30 can be secured to a top 33 of one of the panels at the rear end 24 of the vehicle 10. The support structure 30 is fixed to the component by any suitable methods, and non-limiting examples can include one or more of fastener(s), welding, adhesive, coupler(s), press fit, interference fit, etc., and combinations thereof. As non-limiting examples, the support structure 30 can be one or more posts and/or part of the vehicle body 14 such as a front bumper.

Continuing with FIGS. 1 and 2, the aerodynamic control system 12 also includes an aerodynamic element 34 supported by the support structure 30. The aerodynamic element 34 may be configured as a wing-shaped spoiler. "Wing-shaped" is herein defined as having a shape of a wing, i.e., a fin having a shape of an airfoil defined by a streamlined cross-sectional shape producing lift for flight or propulsion through a fluid. The term "spoiler" means an aerodynamic device capable of disrupting air movement across the vehicle body 14 while the vehicle 10 is in motion, thereby reducing drag and/or inducing an aerodynamic downforce F on the vehicle 10. The term "downforce" means a force component that is perpendicular to the direction of relative motion of the vehicle 10, i.e., in the longitudinal direction, toward the road surface 13. For example, the spoiler can diffuse air by increasing the amount of turbulence flowing over it. Moreover, the aerodynamic element 34 may be formed from a suitably rigid but low mass material, such as an engineered plastic or aluminum, for structural stability. The aerodynamic element 34 is movable between a first position relative to the support structure 30 and a second position relative to the support structure 30. FIG. 1 illustrates examples of two different positions of the aerodynamic element 34 proximal to the rear end 24 of the vehicle 10, one in solid lines and one in phantom lines for illustrative purposes only. It is to be appreciated that the aerodynamic element 34 can move in other positions than illustrated.

An airflow can pass across the aerodynamic element 34 as the vehicle 10 travels across the road surface 13. Depending on the position of the aerodynamic element 34, the airflow can be changed, which can change the vehicle's aerodynamic characteristics. For example, the aerodynamic element 34 is movable to change an aerodynamic downforce F applied to the vehicle 10 as the vehicle 10 travels across the road surface 13. Therefore, the aerodynamic element 34 can adjust performance characteristics of the vehicle 10. The aerodynamic element 34 can be configured such that the airflow passes over the top of the aerodynamic element 34 relative to the road surface 13, or alternatively, the aerodynamic element 34 can be configured such that the airflow passes over the top of the aerodynamic element 34 and the bottom of the aerodynamic element 34 relative to the road surface 13.

The aerodynamic element 34 can include one or more of a spoiler or a wing disposed at any location along a top of the vehicle 10, a dive wing disposed at any location along a corner of the vehicle 10, a gurney flap disposed at any location along the front end 22 of the vehicle 10 or disposed on a spoiler, a front splitter disposed at any location along the front end 22 of the vehicle 10 (example of the front splitter shown in FIG. 1), a front air dam disposed at any location along the front end 22 of the vehicle 10, etc. It is to be appreciated that more than one aerodynamic element 34 can be utilized. Each of the aerodynamic elements 34 can include one or more of the features discussed herein for the single aerodynamic element 34.

The aerodynamic element 34 can be any suitable configuration, and FIG. 1 illustrates two different examples of the aerodynamic element 34. For example, the aerodynamic element 34 can be disposed closer to the rear end 24 of the vehicle 10 than the front end 22 of the vehicle 10. Specifically, the aerodynamic element 34 can be supported by a trunk lid of the vehicle 10 proximal to the rear end 24. As another example, the aerodynamic element 34 can be disposed closer to the front end 22 of the vehicle 10 than the rear end 24 of the vehicle 10. Specifically, the aerodynamic element 34 can be supported by a front bumper of the vehicle 10 at the front end 22 (this aerodynamic element 34 is shown in phantom lines at the front end 22). It is to be appreciated that the aerodynamic element 34 at the front end 22 of the vehicle 10 is exaggerated for illustrative purposes only.

Figure 3:
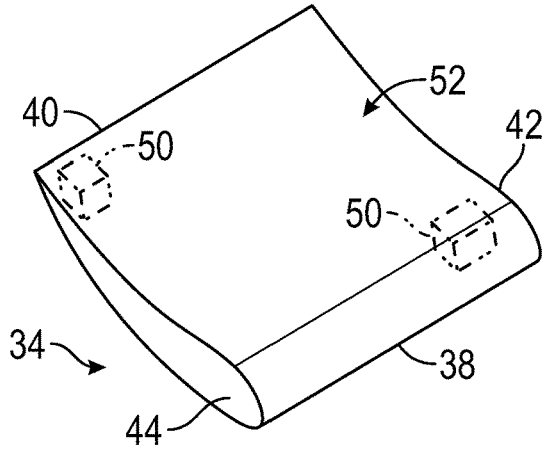
FIG. 3 is a schematic perspective view of an aerodynamic element.

As best shown in FIG. 1, the aerodynamic element 34 can include a first end 38 and a second end 40 spaced from each other. In certain embodiments, the first end 38 of the aerodynamic element 34 can be disposed closer to the passenger compartment 16 than the second end 40 of the aerodynamic element 34. Furthermore, as best shown in FIG. 3, the aerodynamic element 34 can include a first side 42 and a second side 44 spaced from each other. Generally, the first and second sides 42, 44 are spaced from each other in the cross-car direction. As such, in certain embodiments, the aerodynamic element 34 can be elongated in the cross-car direction.

As best shown in FIG. 2, the aerodynamic control system 12 can include a pivot point 46 coupled to the aerodynamic element 34 to allow the aerodynamic element 34 to move between the first and second positions. In certain embodiments, the pivot point 46 can be disposed between the first and second ends 38, 40 of the aerodynamic element 34. For example, as shown in FIG. 1, the aerodynamic element 34 that is proximal to the rear end 24 illustrates the pivot point 46 between the first and second ends 38, 40. In other embodiments, the pivot point 46 can be disposed at one of the first and second ends 38, 40 of the aerodynamic element 34. For example, as shown in FIG. 1, the aerodynamic element 34 that is proximal to the front end 22 illustrates the pivot point 46 at the first end 38.

Continuing with FIG. 2, the aerodynamic control system 12 further includes an actuator 48 coupled to the aerodynamic element 34. The actuator 48 is configured to move the aerodynamic element 34 between the first and second positions. The actuator 48 can be coupled to the aerodynamic element 34 in any suitable location to move the aerodynamic element 34 between the positions. In certain embodiments, the actuator 48 can be disposed inside or outside of the support structure 30. In other embodiments, the actuator 48 can be coupled or attached to the vehicle body 14. In yet other embodiments, the actuator 48 can be disposed inside the aerodynamic element 34. The actuator 48 can include a motor, a solenoid, an arm and/or any other suitable apparatus to move the aerodynamic element 34 to the target position.

Additionally, referring to FIGS. 1-3, the aerodynamic control system 12 includes an inertia measurement unit (IMU) 50 secured to the aerodynamic element 34. In certain embodiments, the IMU 50 can be disposed inside the aerodynamic element 34. Said differently, the IMU 50 can be embedded into the aerodynamic element 34. In other embodiments, the IMU 50 is disposed along one or more outer surfaces 52 of the aerodynamic element 34. Generally, the outer surfaces 52 of the aerodynamic element 34 can be visible from outside of the vehicle 10, and therefore, the outer surfaces 52 of the aerodynamic element 34 are generally smooth for aerodynamic purposes. If utilizing more than one aerodynamic element 34, one or more IMUs 50 can be utilized with each of the aerodynamic element 34. A plurality of IMUs 50 is discussed further below. Additionally, if utilizing more than one aerodynamic element 34, one or more actuators 48 can be utilized. Each of the actuators 48 can include one or more of the features discussed herein for the single actuator 48.

FIGS. 2 and 3 illustrate examples of different suitable locations of the IMU 50. It is to be appreciated that the IMU 50 can be in other locations than illustrated. In certain embodiments, the IMU 50 is spaced from the pivot point 46. Therefore, in certain embodiments, the IMU 50 can be disposed closer to the second end 40 of the aerodynamic element 34 than the first end 38 of the aerodynamic element 34. In other embodiments, the IMU 50 can be disposed closer to the first end 38 of the aerodynamic element 34 than the second end 40 of the aerodynamic element 34. Furthermore, in certain embodiments, the IMU 50 can be disposed closer to the first side 42 of the aerodynamic element 34 than the second side 44 of the aerodynamic element 34. In other embodiments, the IMU 50 can be disposed closer to the second side 44 of the aerodynamic element 34 than the first side 42 of the aerodynamic element 34.

Generally, the IMU 50 can compile data regarding the vehicle 10 to optimize the aerodynamic downforce F of the vehicle 10, which can improve control of the vehicle 10. As such, the IMU 50 can compile data regarding yaw, roll and pitch of the vehicle 10 relative to the road surface 13. For example, the IMU 50 is configured to compile data regarding the position of the aerodynamic element 34. Specifically, the IMU 50 can compile data regarding the position of the aerodynamic element 34 relative to the road surface 13. Furthermore, the IMU 50 can compile data regarding the motion of the vehicle 10. For example, the IMU 50 can be configured to compile data regarding yaw and roll of the vehicle body 14. Additionally, the IMU 50 can compile data regarding the amount of aerodynamic downforce F applied to the aerodynamic element 34. Therefore, utilizing the IMU 50 with the aerodynamic element 34 can assist in determining the optimal position of the aerodynamic element 34 and/or more accurately controlling the aerodynamic downforce F of the vehicle 10.

In certain embodiments, the IMU 50 can include an accelerometer. The accelerometer can include a single-axis type of accelerometer or a multi-axis type of accelerometer. For example, the accelerometer can be configured to compile data regarding motion of the vehicle body 14, such as acceleration, velocity and/or the rate of change of velocity of the vehicle body 14.

In other embodiments, the IMU 50 can include a gyroscope. The gyroscope can detect multiple degrees of motion of the vehicle 10. Therefore, the gyroscope can detect yaw, roll and pitch of the vehicle 10. In yet other embodiments, the IMU 50 can include both the accelerometer and the gyroscope.

Referring to FIG. 2, the aerodynamic control system 12 can include an aero controller 54 in communication with the IMU 50 to receive the compiled data, and in communication with the actuator 48 to control the position of the aerodynamic element 34 in light of the compiled data from the IMU 50. For example, the aero controller 54 can be in communication with the IMU 50 and the actuator 48 such that data compiled from the IMU 50 regarding yaw and roll are utilized to control the position of the aerodynamic element 34 via the actuator 48. In certain embodiments, the aero controller 54 can be in communication with the accelerometer such that data compiled from the accelerometer is utilized to control the position of the aerodynamic element 34 via the actuator 48. Therefore, the aero controller 54 can be in communication with the IMU 50, the accelerometer and the actuator 48 such that data compiled from the accelerometer and the IMU 50 are utilized to control the position of the aerodynamic element 34 via the actuator 48. Furthermore, in certain embodiments, the aero controller 54 can be in communication with the gyroscope such that data compiled from the gyroscope is utilized to control the position of the aerodynamic element 34 via the actuator 48.

Instructions can be stored in an aero memory 56 of the aero controller 54 and automatically executed via an aero processor 58 of the aero controller 54 to provide the respective control functionality. The aero controller 54 is configured to execute the instructions from the aero memory 56, via the aero processor 58. For example, the aero controller 54 can be a host machine or distributed system, e.g., a computer such as a digital computer or microcomputer, and, as the aero memory 56, tangible, non-transitory computer-readable memory such as read-only memory (ROM) or flash memory. The aero controller 54 can also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the aero controller 54 can include all software, hardware, aero memory 56, algorithms, connections, sensors, etc., necessary to control and/or communication, for example, with the actuator 48 and the IMU(s) 50. As such, a control method operative to control the actuator 48, can be embodied as software or firmware associated with the aero controller 54. It is to be appreciated that the aero controller 54 can also include any device capable of analyzing data from various sensors, comparing data, making the necessary decisions required to control, monitor and/or communicate with the actuator 48 and/or the IMU(s) 50.

Optionally, more than one aero controller 54 can be utilized. For example, if one or more IMUs 50 are being utilized in separate aerodynamic elements 34, then one aero controller 54 can be in communication with all of the IMUs 50, or more than one aero controller 54 can be in communication with various IMUs 50. If utilizing a plurality of controllers 54, each of the aero controllers 54 can optionally be in communication with each other. Each of the aero controllers 54 can include one or more of the features discussed herein for the single aero controller 54.

As mentioned above, the aerodynamic control system 12 can include more than one IMU 50. Each of the IMUs 50 can include one or more of the features discussed herein for the single IMU 50. In certain embodiments, the IMU 50 is further defined as a first IMU 50, and the aerodynamic control system 12 can include a second IMU 50 secured to the aerodynamic element 34 and spaced from the first IMU 50. In certain embodiments, the first IMU 50 and second IMU 50 are spaced from the pivot point 46. The first and second IMUs 50 can be in any of the locations discussed above. In this embodiment, the aero controller 54 can be in communication with the actuator 48, the first IMU 50 and the second IMU 50 such that data compiled from the first IMU 50 and the second IMU 50 are utilized to control the position of the aerodynamic element 34 via the actuator 48.

In certain embodiments, the first IMU 50 and the second IMU 50 can each include an accelerometer. Examples of the features of the accelerometer are discussed above, and will not be re-discussed. In this embodiment, the aero controller 54 can be in communication with the accelerometer of each of the IMUs 50 such that data compiled from the accelerometer of each of the IMUs 50 is utilized to control the position of the aerodynamic element 34 via the actuator 48. Furthermore, in certain embodiments, the first IMU 50 and the second IMU 50 each include a gyroscope. Examples of the features of the gyroscope are discussed above, and will not be re-discussed. In this embodiment, the aero controller 54 is in communication with the gyroscope of each of the IMUs 50 such that data compiled from the gyroscope of each of the IMUs 50 is utilized to control the position of the aerodynamic element 34 via the actuator 48. The IMUs 50 can also determine the aerodynamic downforce at the front and rear of the vehicle 10.

The aerodynamic control system 12 can eliminate the use of position sensors disposed along the aerodynamic element 34. Position sensors can detect pitch of the vehicle 10 but cannot detect yaw and roll of the vehicle 10. The aerodynamic control system 12 can be utilized with an active system. In other words, as the vehicle 10 is moving, the aerodynamic element 34 can be adjusted automatically due to data regarding the vehicle 10, e.g., the vehicle 10 accelerating, the vehicle 10 decelerating, the vehicle 10 stopping, the vehicle 10 turning, the vehicle 10 traveling straight, etc.; the aerodynamic element 34 and/or the road surface 13. Accordingly, in certain embodiments, the aerodynamic control system 12 does not include a position sensor.

Figure 4:
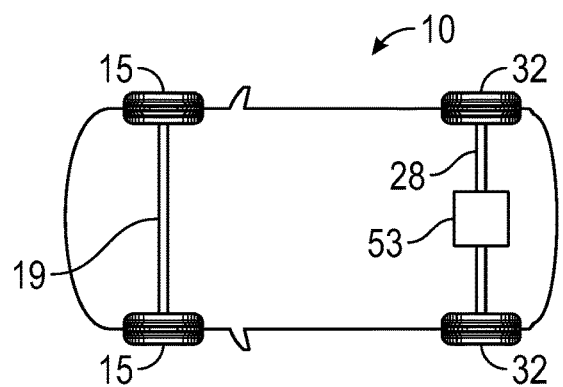
FIG. 4 is a schematic illustration of the vehicle shown in FIG. 1.

With continued reference to FIGS. 3 and 4, the vehicle 10 includes a power plant, such as an internal combustion engine, a first axle (i.e., the front axle 19), and a second axle (i.e., the rear axle 28). The rear wheels 32 are coupled to the rear axle 28. An electronic limited slip differential (eLSD) 53 is coupled to the rear axle 28. The vehicle 10 also includes a steering wheel 29 configured to control a direction of the vehicle 10 via turning the front wheels 15 through an input of a specific steering wheel angle. The intended direction of the vehicle 10 may be identified by the steering wheel angle, which can be detected by a steering angle sensor 45 connected to the steering wheel 29. The vehicle 10 also includes an accelerator pedal 51. The accelerator pedal 51 is in electronic communication with the eLSD controller 37. Accordingly, the eLSD controller 37 can determine the throttle position based on the input from the accelerator pedal 51.

The vehicle 10 may also include an eLSD controller 37, which may be an electronic control unit (ECU) that is employed to control the eLSD 53. Alternatively or additionally, the eLSD 53 can be directly controlled by the aero controller 54. The eLSD controller 37 is configured to execute the instructions from an eLSD memory 57, via an eLSD processor 59. For example, the eLSD controller 37 can be a host machine or distributed system, e.g., a computer such as a digital computer or microcomputer, and, as the eLSD memory 57, tangible, non-transitory computer-readable memory such as read-only memory (ROM) or flash memory. The eLSD controller 37 can also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the eLSD controller 37 can include all software, hardware, eLSD memory 57, algorithms, connections, sensors, etc., necessary to control and/or communicate, for example, with the eLSD 53. As such, a control method operative to control the eLSD 53 can be embodied as software or firmware associated with the aero controller 54. It is to be appreciated that the eLSD controller 37 can also include any device capable of analyzing data from various sensors, comparing data, making the necessary decisions required to control, monitor and/or communicate with the eLSD 53. The vehicle 10 also includes a brake pedal 55 in electronic communication with the eLSD controller 37. Accordingly, the eLSD controller 37 can determine the brake pedal position based on inputs from the brake pedal 55. The steering angle sensor 45 is in electronic communication with the eLSD controller 37. Accordingly, the eLSD controller 37 the steering angle of the steering wheel 29 and the yaw of the vehicle 10 based on inputs from the steering angle sensor 45. The eLSD controller 37 is in electronic communication with the IMU 50 through the aero controller 54. Accordingly, the eLSD controller 37 can determine the aerodynamic downforce based on input from the IMUs 50.

The eLSD controller 37 is configured or programmed to determine in real-time rotating speeds of each of the first set of wheels (i.e., the front wheels 15) and of the second set of wheels (i.e., the rear wheels 32), including individual rotating speeds of the left- and right-side rear wheels 32, relative to the road surface 13 when the vehicle 10 is being driven. The rotating speed of each wheel 15, 32 may be sensed via appropriate individual sensors 36, such as speed sensors, positioned at the respective wheels and communicated to the eLSD controller 37 for signal processing. The eLSD controller 37 is also programmed to determine the speed of the vehicle 10 relative to the road surface 13, as well as longitudinal acceleration of the vehicle 10. The eLSD controller 37 may estimate the speed of the vehicle 10 by using the sensed rotating speeds of the side wheels 15, 32.

The eLSD controller 37 is also programmed to determine a slip of the vehicle 10 relative to the road surface 13. The slip of the vehicle 10 may include a measure of how much the first and second sets of wheels (i.e., the front wheels 15 and the rear wheels 32) have slipped in a longitudinal direction, i.e., in the direction along the vehicle axis X. Specifically, the slip of the vehicle 10 in the longitudinal direction may include a measure of how much any individual side wheel 15-1, 15-2, 32-1, and 32-2 has slipped longitudinally, as identified by the discrepancy between the determined speed of the vehicle and the corresponding rotating speed of each particular wheel. The slip of the vehicle 10 may also include a measure of how much any of the wheels 15, 32 have slipped a transverse direction, i.e., in a direction generally perpendicular to the longitudinal direction (shown by double arrow 26), which identifies that the vehicle 10 has deviated from its intended direction or path along the road surface 13. The intended direction of the vehicle 10 may be identified by the steering wheel angle, which can be detected by a steering angle sensor 45 connected to the steering wheel 29 and communicated to the eLSD controller 37.

During operation, a situation may develop when the vehicle 10 experiences traction loss at one or more of the drive wheels, which may take place in the first set of wheels (i.e., the front wheels 15) and/or the second set of wheels (i.e., the rear wheels 32). Such traction loss may be a result of driving demands of the operator of the vehicle 10, such as rapid acceleration from a stop or powering around a turn, which may cause an unloading and slipping of an inside wheel, and/or road conditions, such as inclement weather or a loose road surface 13. The eLSD 53 is electronically controlled by the eLSD controller 37 and generally function to maintain traction in off-road or slippery conditions, such as rain, snow or ice. In a standard open differential (i.e., a vehicle without any type of limited slip differential), a wheel which is slipping due to the road or off-road conditions (e.g., a wheel not in contact with the ground, slipping in dirt, sand, etc.) receives the majority of the power from the engine, while a wheel which is still in contact with the road (i.e., still has traction) will remain stationary. Limited slip differentials, including eLSD, prevent excess power from being allocated to the slipping wheel, thereby keeping both wheels in powered rotation. In one embodiment, for example, the eLSD 53 may include a planetary or bevel gear set and a clutch pack (not illustrated). The eLSD 53 will then be configured to apportion the drive torque between the left-side rear wheel 32 and right-side rear wheel 32.

In order to regulate the eLSD 53 and vary the torque outputs on the rear axle 28 and/or the front axle 19, the eLSD controller 37 may also determine a reference rotating speed of each of the rear wheels 32 relative to the road surface 13, i.e., a theoretical wheel speed corresponding to the determined road speed of the vehicle 10. The eLSD controller 37 may then determine slip of each of the rear wheels 32 relative to the road surface 13 based on the difference between the determined reference rotating speed and the actual rotating speed of each of the rear wheels 32. Accordingly, the eLSD controller 37 may be configured to arbitrate the appropriate torque split between the rear wheels 32 to thereby control the yaw rate of the vehicle 10.

Additionally, the eLSD controller 37 may be programmed with a look-up table having predetermined values for the steering wheel angle, the yaw rate, the difference between the rotating speeds of each of the first and second sets of wheels (i.e., the front wheels 15 and the rear wheels 32), and the speed of the vehicle 10. The values for the steering wheel angle, the yaw rate, the difference between the rotating speeds of each of the first and second sets of wheels (i.e., the front wheels 15 and the rear wheels 32), and the speed of the vehicle 10 programmed into the eLSD controller 37 may be established empirically, i.e., through appropriate testing under controlled conditions. Accordingly, the eLSD controller 37 may control the slip of the vehicle 10 relative to the road surface 13 in a feed-forward or predictive control loop via comparing the determined steering wheel angle, yaw rate, and a difference between the rotating speeds of each of the first and second sets of wheels (i.e., the front wheels 15 and the rear wheels 32) and the speed of the vehicle with predetermined respective values in the look-up table and correspondingly regulating the torque outputs on the front axle 19 and/or the rear axle 28.

Figure 5:
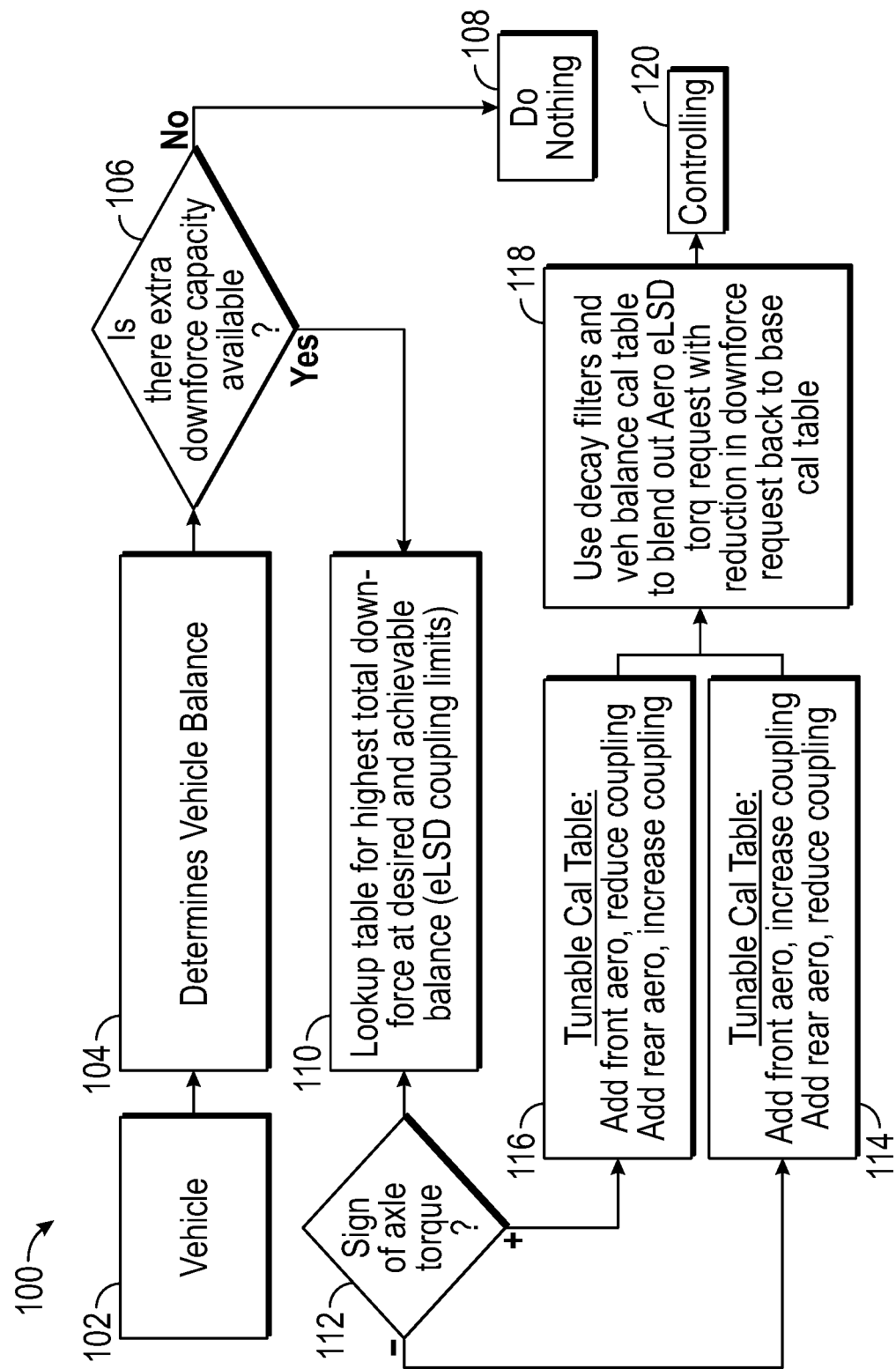
FIG. 5 is a flowchart of a method for actively controlling an electronic limited slip differential with data from the aerodynamic control system.

FIG. 5 is a flowchart of a method 100 for actively controlling the eLSD 53 with data from the aerodynamic control system 12. The method 100 uses the aero controller 54 to send a torque coupling request/modification to the eLSD 53. The method 100 employs the commanded aero load balance, vehicle balance, steering angle information, yaw information, throttle and brake position, and drive axle torque as inputs to determine the vehicle balance and total aerodynamic downforce generating capacity during a maneuver. In response to these inputs, the aero controller 54 (directly or through the eLSD controller 37) modifies the eLSD clutch torque command in order to maximize the amount of total downforce that can be utilized while still maintaining the target vehicle balance. When there is extra aerodynamic downforce capacity available that normally would not be used, the aero controller 54 (directly or through the eLSD controller 37) requests an increase or decrease in the coupling torque across the eLSD 53 while simultaneously increasing the amount of downforce deployed in order to achieve a higher overall amount of downforce while still satisfying the target vehicle downforce. The overall performance of the vehicle 10 is thus increased above what is achievable with stand-along eLSD and the aerodynamic control system.

The method 100 begins at step 102. At step 102, the eLSD controller 37 receives input signals (e.g., data) from the aero controller 54 and the IMU 50. To do so, the aero controller 54 is in electronic communication with the vehicle controller 37 as shown in FIG. 2. At step 102, the eLSD controller 37 receives inputs (e.g., the aerodynamic downforce) from the IMUs 50 through the aero controller 54. In addition, at step 102, the eLSD controller 37 receives the steering angle data and yaw information from the steering angle sensor 45, the throttle position from the accelerator pedal 51, the brake position from the brake pedal 55, and the drive axle torque (e.g., the torque on the rear axle 28) from, for example, the sensor 36. For instance, the eLSD controller 37 can determine the torque on the rear axle 28 based on the rotational speed measured by the sensor 36. After receiving these inputs, the method 100 proceeds to step 104.

At step 104, the eLSD controller 37 determines the target vehicle balance of the vehicle 10 based on the aerodynamic balance downforce F on the front axle 19 and the rear axle 28 (as, for example, measured by the IMUs 50). The aerodynamic balance downforce F may be calibrated by empirically testing of the vehicle 10. For example, the vehicle balance can be determined based on the aerodynamic downforce F on the front axle 19, an inertial load on the front axle 19, an aerodynamic downforce on the rear axle 28, and an inertial load on the rear axle 28. In the present disclosure, the "vehicle balance" refers to the instantaneous vehicle balance that takes into account not only the aerodynamic downforce F but also the inertial mass transfer at each tire as the car moves around on its suspension executing various maneuvers. For example, the vehicle balance may be calculated as follows: (front axle aerodynamic downforce+front axle inertial load)/(front axle aerodynamic downforce+front axle inertial load)+(rear axle aerodynamic downforce+rear axle inertial force). The axle loads are calculated by determining the inertial loads at each individual tire and summing the tires on the same axle. The inertial loads at the tires are calculated using the known kinematic or dynamic bicycle model. Both bicycle models are dependent on the correct calibrations, which are determined empirically and may therefore vary considerably from vehicle to vehicle or even between different variations of the same model. The dynamic or kinematic bicycle model employs as inputs, among other things, the steering angle of the vehicle 10 received from the steering angle sensor 45, and the speed of the vehicle 10 estimated using the sensed rotating speeds of the side wheels 15, 32 measured by the sensors 36. After determining the vehicle balance at step 104, the method 100 proceeds to step 106.

At step 106, the differential controller 37 determines whether there is a surplus downforce capacity available based on the vehicle balance determined in step 104. Stated differently, the differential controller 37 determines whether there is a surplus downforce capacity available that allows the vehicle 10 to maintain the target vehicle balance. To do so, the eLSD controller 37 compares the downforce capacity available with a predetermined downforce required to perform the current vehicle maneuver. The predetermined downforce required to perform the current vehicle maneuver is determined empirically by testing the vehicle 10. If the downforce capacity available is greater than the predetermined downforce required to perform the current vehicle maneuver, then there is downforce capacity available. Otherwise, there is no downforce capacity available. If there is no downforce capacity available, then the method 100 proceeds to step 108. At step 108, nothing is done, and the method 100 ends. If there is downforce capacity available, then the method 100 proceeds to step 110. At step 110, the differential controller 37 looks in a lookup table stored in the eLSD memory 57 for the highest total downforce possible for the current vehicle maneuver based on a coupling limits of the eLSD 53. The highest total downforce possible for the current vehicle maneuver is determined empirically by testing the eLSD 53 and/or the vehicle 10. Next, the method 100 proceeds to step 112.

At step 112, the eLSD controller 37 determines the sign of the axle torque. In other words, the eLSD controller 37 determines if the vehicle 10 is braking or coasting, in which case the sign of the axle torque is negative. To do so, the eLSD controller 37 can determine whether the vehicle 10 is coasting or braking based on the inputs from the brake pedal 55 and/or the accelerator pedal 51. At step 112, the eLSD controller 37 also determines whether the vehicle 10 is accelerating, in which case the sign of the axle torque is positive. The eLSD controller 37 can determine that the vehicle 10 is accelerating based on the inputs from the accelerator pedal 51.

If the vehicle 10 is coasting or braking, then the method 100 proceeds to step 114. At step 114, the eLSD controller 37 tunes or updates the lookup table stored in the eLSD memory 57. Specifically, in the lookup table, the aerodynamic controller 54 adjusts the position of one or more of the aerodynamic elements 34 to increase the aerodynamic downforce F on the front axle 19, while simultaneously the eLSD controller 37 commands the eLSD 53 to increase the coupling torque across of the eLSD 53. Alternatively, at step 114, in the lookup table, the aero controller 54 adjusts one or more of the aerodynamic elements 34 to increase the aerodynamic downforce F on the rear axle 28, while simultaneously the eLSD controller 37 commands the eLSD 53 to decrease the coupling torque of the eLSD 53.

If the vehicle 10 is accelerating, then the method 100 proceeds to step 116. At step 116, the eLSD controller 37 tunes or updates the lookup table stored in the eLSD memory 57. Specifically, in the lookup table, the aero controller 54 adjusts the position of one or more of the aerodynamic elements 34 to increase the aerodynamic downforce F on the front axle 19, while simultaneously the eLSD controller 37 commands the eLSD 53 to decrease its coupling torque. Alternatively, at step 114, the aero controller 54 adjusts one or more of the aerodynamic elements 34 to increase the aerodynamic downforce F on the rear axle 28, while simultaneously the eLSD controller 37 commands the eLSD 53 to increase its coupling torque. After either step 114 or step 116, the method 100 proceeds to step 118.

At step 118, eLSD controller 37 uses decay filters and the vehicle balance calibration table to smooth the eLSD request data based on the aerodynamic information. For example, the decay filter may smooth the eLSD request data, and then the downforce data is reverted back to the base calibration table. Then, the method 100 proceeds to step 120.

At step 120, the eLSD controller 37 adjusts the amount of coupling torque in the eLSD 53 based on the tuned lookup table as determined in steps 114, 116, and 118 and taking into account the coupling limits of the eLSD 53 determined in step 110. Further, at step 120, the aero controller 54 adjusts the position of the aerodynamic element 34 relative to the vehicle body 14 as determined in steps 114, 116, and 118 while simultaneously adjusting the coupling torque across the eLSD 53. For example, at step 120, the aerodynamic downforce F on the front axle 19 is increased using the aerodynamic element 34 in response to determining that the vehicle 10 is braking or coasting. To do so, the aero controller 54 can adjust the position of one or more of the aerodynamic elements 34 with respect to the vehicle body 14, while simultaneously the coupling torque across the eLSD 53 can be increased in response to determining that the vehicle 10 is braking or coasting by controlling the eLSD 53 through the eLSD controller 37. Also at step 120, the aerodynamic downforce F on the rear axle 28 is increased using the aerodynamic element 34 in response to determining that the vehicle 10 is braking or coasting, while simultaneously decreasing the coupling torque across the eLSD 53 in response to determining that the vehicle is at least one of braking or coasting. At step 120, the aerodynamic downforce F on the front axle 19 is increased using the aerodynamic element 34 in response to determining that the vehicle 10 is accelerating, while simultaneously decreasing the coupling torque across the eLSD 53 in response to determining that the vehicle 10 is accelerating by controlling the eLSD 53. At step 120, the aerodynamic downforce F on the rear axle 28 is increased using the aerodynamic element 34 in response to determining that the vehicle 10 is accelerating. At step 120, the coupling torque across the eLSD 53 is increased in response to determining that the vehicle 10 is accelerating. The eLSD controller 37 and/or the aero controller 54 can perform the entire method 100 or part of the method 100. Accordingly, the aero controller 54 can control not only the aerodynamic elements 34 but also the eLSD 53. Alternatively or additionally, the eLSD controller 37 can control not only the eLSD 53 but also the aerodynamic elements 34. Therefore, the method 100 can be executed by a single controller or more than one controllers.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other target characteristics from other embodiments, resulting in other embodiments not described in words or by reference to the drawings. Accordingly, such other embodiments fall within the framework of the scope of the appended claims.

What is claimed is:

1. A method, comprising:
   determining, via at least one controller, a target vehicle balance of a vehicle, wherein the vehicle includes a vehicle body, an aerodynamic element coupled to the vehicle body, a rear axle, a front axle, a pair of rear wheels coupled to the rear axle, a pair of front wheels coupled to the front axle, an electronic limited slip differential (eLSD) coupled to the rear axle, and the target vehicle balance is based on an aerodynamic downforce on the rear axle and the front axle;

determining, via the at least one controller, that there is a surplus downforce capacity available based on the target vehicle balance; and
automatically controlling, by the at least one controller, the eLSD in response to determining that there is the surplus downforce capacity available.

2. The method of claim 1, further comprising determining a highest total downforce possible based on a coupling limits of the eLSD.

3. The method of claim 2, further comprising determining that the vehicle is at least one of braking or coasting in response to determining that there is the surplus downforce capacity available.

4. The method of claim 3, wherein the vehicle includes a front axle coupled to the vehicle body, and the method further comprises increasing the aerodynamic downforce on the front axle using the aerodynamic element in response to determining that the vehicle is at least one of braking or coasting.

5. The method of claim 4, further comprising increasing a coupling torque across the eLSD in response to determining that the vehicle is at least one of braking or coasting.

6. The method of claim 3, further comprising increasing the aerodynamic downforce on the rear axle using the aerodynamic element in response to determining that the vehicle is at least one of braking or coasting.

7. The method of claim 6, further comprising decreasing a coupling torque across the eLSD in response to determining that the vehicle is at least one of braking or coasting.

8. The method of claim 2, further comprising determining that the vehicle is accelerating.

9. The method of claim 8, further comprising increasing an aerodynamic downforce on a front axle of the vehicle using the aerodynamic element in response to determining that the vehicle is accelerating.

10. The method of claim 9, further comprising decreasing a coupling torque across the eLSD in response to determining that the vehicle is accelerating.

11. The method of claim 8, further comprising increasing an aerodynamic downforce on the rear axle using the aerodynamic element in response to determining that the vehicle is accelerating.

12. The method of claim 11, further comprising increasing a coupling torque across the eLSD in response to determining that the vehicle is accelerating.

13. The method of claim 12, wherein the target vehicle balance is based on an aerodynamic downforce on a front axle of the vehicle, an inertial load on the front axle, and an inertial load on the rear axle.

14. The vehicle of claim 13, wherein the aerodynamic element is a wing-shaped spoiler, the vehicle further includes a support structure, the wing-shaped spoiler is supported by the support structure, the wing-shaped spoiler is movable relative to the support structure between a first spoiler position and a second spoiler position, the vehicle further includes an actuator coupled to the wing-shaped spoiler, the actuator is configured to move the wing-shaped spoiler between the first spoiler position and the second spoiler position; and the vehicle further includes an inertia measurement unit (IMU) secured to the wing-shaped spoiler, the IMU is configured to compile data regarding a position of the wing-shaped spoiler, the vehicle further includes a pivot point coupled to the wing-shaped spoiler to allow the wing-shaped spoiler to move between the first spoiler position and the second spoiler position, the IMU is spaced from the pivot point, the controller in communication with the IMU, the controller is in communication with the actuator to control the position of the wing-shaped spoiler.

15. The vehicle of claim 14, wherein the IMU includes an accelerometer, the controller is in communication with the accelerometer such that data compiled from the accelerometer of the IMU is utilized to control the position of the wing-shaped spoiler via the actuator, the IMU includes a gyroscope, and the controller is in communication with the gyroscope of the IMU such that data compiled from the gyroscope of the IMU is utilized to control the position of the wing-shaped spoiler via the actuator, the wing-shaped spoiler defines a first end and a second end spaced from each other, the pivot point is disposed between the first end and the second end, and the IMU is disposed closer to the second end than the first end, the IMU is configured to compile data regarding yaw and roll of the vehicle body, and the controller is in communication with the IMU and the actuator such that data compiled from the IMU regarding yaw and roll are utilized to control the position of the wing-shaped spoiler via the actuator.

16. A vehicle, comprising:
a vehicle body;
an aerodynamic element coupled to the vehicle body;
a rear axle coupled to the vehicle body;
a front axle coupled to the vehicle body;
a pair of rear wheels coupled to the rear axle;
a pair of front wheels coupled to the front axle;
an electronic limited slip differential (eLSD) coupled to the rear axle,
a controller in communication with the aerodynamic element and the eLSD, wherein the controller is programmed to:
determine a target vehicle balance of the vehicle, wherein the target vehicle balance is based on an aerodynamic downforce on the rear axle and the front axle;
determine that there is surplus downforce capacity available based on the target vehicle balance; and
control the eLSD in response to determining that there is surplus downforce capacity available.

17. The vehicle of claim 16, wherein the controller is programmed to determine a highest total downforce possible based on a coupling limits of the eLSD.

18. The vehicle of claim 17, wherein the controller is programmed to determine that the vehicle is at least one of braking or coasting in response to determining that there is the surplus downforce capacity available.

19. The vehicle of claim 18, wherein the controller is programmed to adjust a position of the aerodynamic element so as to increase the aerodynamic downforce on the front axle while simultaneously controlling the eLSD so as to decrease a coupling torque across the eLSD in response to determining that the vehicle is at least one of braking or coasting.

20. The vehicle of claim 19, wherein the controller is programmed to adjust a position of the aerodynamic element so as to increase the aerodynamic downforce on the rear axle using the aerodynamic element while simultaneously controlling the eLSD so as to decrease a coupling torque across the eLSD in response to determining that the vehicle is at least one of braking or coasting.

* * * * *